United States Patent
Stanhope et al.

(10) Patent No.: US 11,250,300 B2
(45) Date of Patent: Feb. 15, 2022

(54) DETECTING PLUGGING OF GROUND-ENGAGING TOOLS OF AN AGRICULTURAL IMPLEMENT FROM IMAGERY OF A FIELD USING A MACHINE-LEARNED CLASSIFICATION MODEL

(71) Applicant: CNH Industrial Canada, Ltd., Saskatoon (CA)

(72) Inventors: Trevor Stanhope, Palos Hills, IL (US); James W. Henry, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 24 days.

(21) Appl. No.: 16/723,724

(22) Filed: Dec. 20, 2019

(65) Prior Publication Data
US 2021/0192294 A1    Jun. 24, 2021

(51) Int. Cl.
*G06K 9/62* (2006.01)
*G06K 9/46* (2006.01)

(52) U.S. Cl.
CPC ............. *G06K 9/6268* (2013.01); *G06K 9/46* (2013.01); *G06K 9/6256* (2013.01); *G06K 9/6263* (2013.01)

(58) Field of Classification Search
CPC ...... G06K 9/46; G06K 9/6256; G06K 9/6263; G06K 9/6268
See application file for complete search history.

(56) References Cited

U.S. PATENT DOCUMENTS

| | | | | |
|---|---|---|---|---|
| 8,326,500 | B2* | 12/2012 | Mariman | A01C 5/068 |
| | | | | 701/50 |
| 9,405,039 | B2 | 8/2016 | Anderson | |
| 9,485,900 | B2 | 11/2016 | Connell et al. | |
| 9,560,802 | B1 | 2/2017 | Palla et al. | |
| 10,080,323 | B2* | 9/2018 | Lund | A01B 63/008 |
| 10,188,035 | B2 | 1/2019 | Reich et al. | |

(Continued)

FOREIGN PATENT DOCUMENTS

| | | |
|---|---|---|
| BR | PI0905012 | 6/2018 |
| DE | 102017112224 | 12/2018 |

OTHER PUBLICATIONS

Gill, William et al., "Soil Dynamics in Tillage and Traction," USDA, Feb. 7, 1968.

(Continued)

*Primary Examiner* — Gregory M Desire
(74) *Attorney, Agent, or Firm* — Rebecca L. Henkel; Rickard K. DeMille (57) ABSTRACT

A computing system may be configured to perform operations including obtaining image data depicting a flow of soil around a ground-engaging tool of an agricultural implement as the ground-engaging tool is moved through the soil. Furthermore, the operations may include extracting a set of features from the obtained image data. Moreover, the operations may include inputting the set of features into the machine-learned classification model and receiving a soil flow classification of the set of features as an output of the machine-learned classification model. In addition, the operations may include determining when the ground-engaging tool is plugged based on the soil flow classification of the set of features.

20 Claims, 6 Drawing Sheets

(56) References Cited

U.S. PATENT DOCUMENTS

| | | | |
|---|---|---|---|
| 10,288,166 B2* | 5/2019 | Chrungoo | G08G 1/0112 |
| 10,358,796 B2* | 7/2019 | Robertson | E02F 9/2033 |
| 10,670,708 B2* | 6/2020 | Kemmer | A01D 41/1271 |
| 10,721,859 B2* | 7/2020 | Wu | G06T 7/73 |
| 10,867,377 B2* | 12/2020 | Asada | E02F 9/2025 |
| 11,126,188 B2* | 9/2021 | Spielman | E02F 9/262 |
| 2010/0250123 A1* | 9/2010 | Leman | E02F 9/2054 |
| | | | 701/532 |
| 2015/0296701 A1 | 10/2015 | Anderson | |
| 2017/0196160 A1 | 7/2017 | Bjerketvedt et al. | |
| 2018/0352718 A1 | 12/2018 | Kovach et al. | |
| 2019/0377986 A1 | 12/2019 | Ferrari et al. | |
| 2020/0325655 A1* | 10/2020 | Hageman | E02F 9/265 |
| 2020/0387720 A1 | 12/2020 | Stanhope | |

OTHER PUBLICATIONS

Extended European Search Report issued in Corresponding to Application No. 20215197.3-1004 dated May 26, 2021 (7 pages).

\* cited by examiner

DETECTING PLUGGING OF GROUND-ENGAGING TOOLS OF AN AGRICULTURAL IMPLEMENT FROM IMAGERY OF A FIELD USING A MACHINE-LEARNED CLASSIFICATION MODEL

FIELD OF THE INVENTION

The present disclosure generally relates to detecting plugging of ground-engaging tools of an agricultural implement and, more particularly, to detecting plugging of ground-engaging tools of an agricultural implement from imagery of a field using a machine-learned classification model.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground-engaging tools, such as shanks, harrow disc blades, leveling blades, and/or the like, that are configured to loosen and/or otherwise agitate the soil to prepare the field for subsequent planting operations.

During tillage operation, soil and/or residue may accumulate on the ground-engaging tools of the seed-planting implement. In certain instances (e.g., when the soil is wet and/or heavy), the amount of soil/residue accumulating on the ground-engaging tools may be sufficient to inhibit the operation of the tools such that the tools become plugged. In such instances, poor seedbed quality may result. As such, systems have been developed that attempt to detect plugged ground-engaging tools. However, such systems suffer from various drawbacks or disadvantages, in particular with respect to the accuracy of the plugging detection.

Accordingly, an improved system and method for detecting plugging of ground-engaging tools of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a computing system. The computing system may include one or more processors and one or more non-transitory computer-readable media. The one or more non-transitory computer-readable media may collectively store a machine-learned classification model configured to receive input data and process the input data to output one or more soil flow classifications for the input data. Additionally, the one or more non-transitory computer-readable media may collectively store instructions that, when executed by the one or more processors, configure the computing system to perform operations. The operations may include obtaining image data depicting a flow of soil around a ground-engaging tool of an agricultural implement as the ground-engaging tool is moved through the soil. Furthermore, the operations may include extracting a set of features from the obtained image data. Moreover, the operations may include inputting the set of features into the machine-learned classification model and receiving a soil flow classification of the set of features as an output of the machine-learned classification model. In addition, the operations may include determining when the ground-engaging tool is plugged based on the soil flow classification of the set of features.

In another aspect, the present subject matter is directed to a computer-implemented method. The computer-implemented method may include obtaining, with a computing system comprising one or more computing devices, image data depicting a flow of soil around a ground-engaging tool of an agricultural implement as the ground-engaging tool is moved through the soil. Additionally, the computer-implemented method may include extracting, with the computing system, a set of features from the obtained image data. Furthermore, the computer-implemented method may include inputting, with the computing system, the set of features into a machine-learned classification model configured to configured to receive input data and process the input data to output one or more soil flow classifications for the set of features. Moreover, the computer-implemented method may include receiving, with the computing system, a soil flow classification of the set of features as an output of the machine-learned classification model. In addition, the computer-implemented method may include determining, with the computing system, when the ground-engaging tool is plugged based on the soil flow classification of the set of features.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting plugging of ground-engaging tools of an agricultural implement. For example, a ground-engaging tool of an agricultural implement may be "plugged" when a sufficient amount of soil and/or residue has accumulated on and/or around the tool such that the operation of the tool is impeded. Specifically, in several embodiments, the disclosed systems and methods may include or otherwise leverage a machine-learned classification model to determine when one or more ground-engaging tools of an agricultural implement are plugged based at least in part on input data associated with the soil flow around the tool(s). As such, the machine-learned classification model may be configured to receive the input data and process the received input data to compute or output one or more soil flow classifications for such input data.

In several embodiments, a computing system of the disclosed system may receive image data captured by one or more imaging devices (e.g., a camera(s) or a LIDAR sensor(s)). Specifically, the imaging device(s) may be in operative association with the implement or an associated work vehicle such that one or more ground-engaging tool(s) (e.g., a shank(s)) of the implement are positioned within the field(s) of view of the imaging device(s). As such, the imaging device(s) may be configured to capture image data depicting the flow of soil around such ground-engaging tool(s) as the tool(s) is moved through the soil of the field during the performance of an agricultural operation (e.g., a tillage operation) by the implement. In this respect, the computing system may extract or otherwise determine one or more sets of features (e.g., the size, shape, velocity, and/or direction of travel of a plurality of soil units within the flow(s) of soil around the tool(s)) from the received image data. Thereafter, the computing system may input the set(s) of extracted features into the machine-learned classification model and, in response, receive a one or more soil flow classifications for the set(s) of features as the output of the machine-learned classification model. For example, the output of the machine-learned classification model may classify the set(s) of features as being associated with a plugged soil flow or a non-plugged soil flow. Thereafter, the computing system may determine whether one or more of the ground-engaging tools of the implement are plugged at least in part based on the soil flow classification of the set(s) of features.

Additionally, when it is determined that one or more ground-engaging tools of the implement are plugged, the systems and methods of the present disclosure may initiate one or more control actions associated with de-plugging the tool(s). For example, the ground speed of the implement, the penetration depth of the ground-engaging tool(s), the force applied to the ground-engaging tool(s), and/or any other suitable operating parameters of the implement and/or an associated work vehicle may be adjusted to de-plug the tool(s) and/or prevent further plugging of the tool(s). Thus, the systems and methods of the present disclosure may enable improved real-time control that eliminates or reduces plugging of the ground-engaging tool(s) of the implement during field operations.

Through the use of a machine-learned classification model, the systems and methods of the present disclosure may detect plugging of the ground-engaging tools of an agricultural implement with greater accuracy. These more accurate detections of plugging may enable improved and/or more precise control of the implement and/or the associated work vehicle to de-plug plugged ground-engaging tool(s) and/or prevent or reduce future plugging of the tool(s), thereby leading to superior agricultural outcomes for the field operation(s) being performed.

Figure 1:
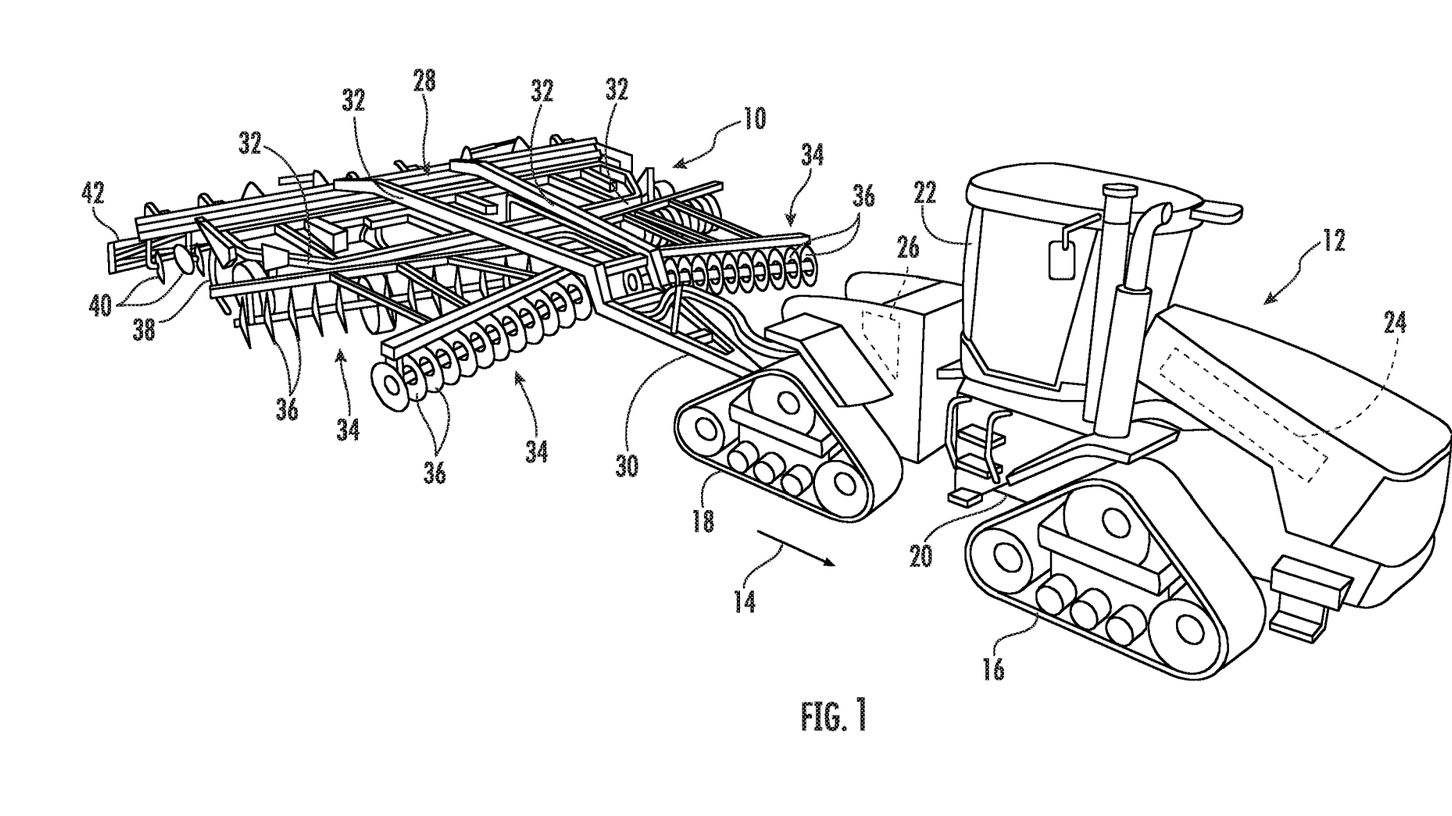
FIG. 1 illustrates a perspective view of one embodiment of an agricultural implement coupled to a work vehicle in accordance with aspects of the present subject matter.

Referring now to the drawings, FIG. 1 illustrates a perspective view of the agricultural implement 10 coupled to a work vehicle 12. In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

Additionally, as shown in FIG. 1, the implement 10 may generally include a frame 28 configured to be towed by the vehicle 12 via a pull hitch or tow bar 30 in the direction of travel 14. In general, the frame 28 may include a plurality of structural frame members 32, such as beams, bars, and/or the like, configured to support or couple to a plurality of components. As such, the frame 28 may be configured to support a plurality of ground-engaging tools, such as a plurality of shanks, disk blades, leveling blades, basket assemblies, tines, spikes, and/or the like. In one embodiment, the various ground-engaging tools may be configured to perform a tillage operation or any other suitable ground-engaging operation on the field across which the implement 10 is being towed. For example, in the illustrated embodiment, the frame 28 is configured to support various gangs 34 of disc blades 36, a plurality of ground-engaging shanks 38, a plurality of leveling blades 40, and a plurality of crumbler wheels or basket assemblies 42. However, in alternative embodiments, the frame 28 may be configured to support any other suitable ground-engaging tool(s) or combinations of ground-engaging tools.

Figure 2:
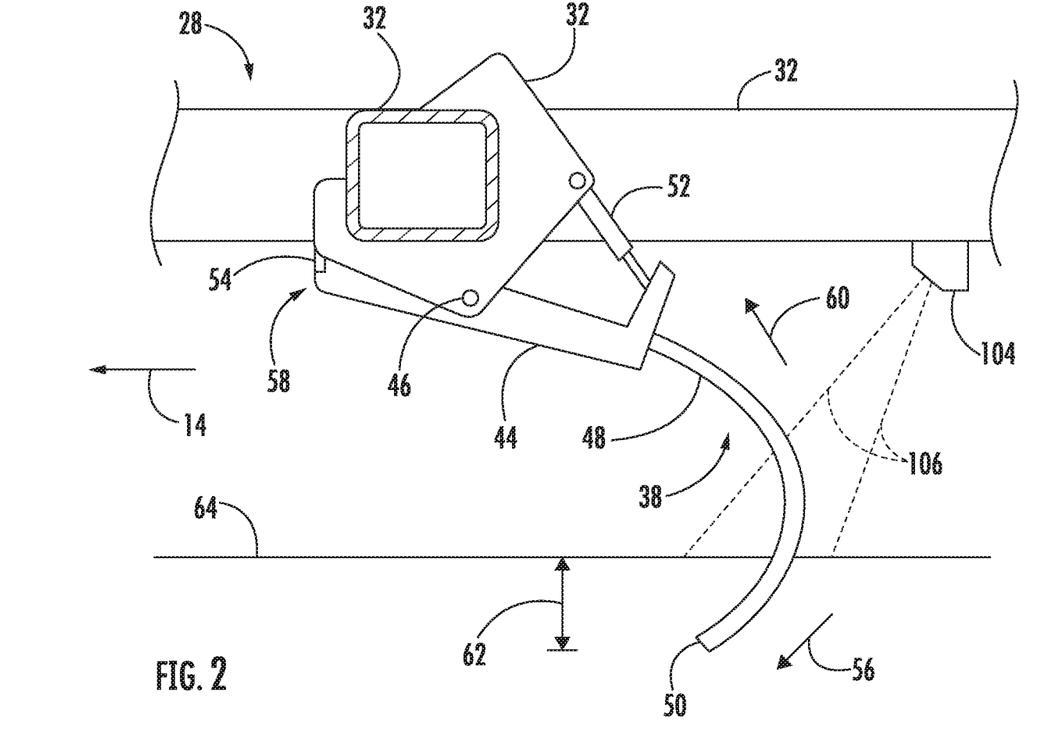
FIG. 2 illustrates a side view of one embodiment of a ground-engaging tool of an agricultural implement in accordance with aspects of the present subject matter.

Referring now to FIG. 2, a side view of one embodiment of a shank 38 is illustrated in accordance with aspects of the present subject matter. As shown, the shank 38 may generally include a base portion 44 pivotally coupled to one of the frame members 32 of the implement frame 28 (e.g., at a pivot joint 46). Furthermore, the shank 38 may include a ground-engaging portion 48 extending from the base portion 44 along a curved or arcuate profile. The ground-engaging portion 48 may include a tip 50 that is configured to penetrate into or otherwise engage the soil as the implement 10 travels across the field. In this respect, the soil within the field may flow around the shank 38 as the shank 38 is pulled through the soil. However, in alternative embodiments, the shank 38 may be configured in any other suitable manner.

In several embodiments, an actuator 52 may be coupled between the frame 28 and the shank 38. As such, the actuator 52 may be configured to bias the shank 38 to a predetermined tool position (e.g., a home or base position) relative to the frame 28. In general, the predetermined tool position may correspond to a tool position in which the shank 38 penetrates the soil or ground to a desired depth. In several embodiments, the predetermined ground engaging tool position may be set by a mechanical stop 54. In operation, the actuator 52 may permit relative movement between the shank 38 and the frame 28. For example, the actuator 52 may be configured to bias the shank 38 to pivot relative to the frame 28 in a first pivot direction (indicated by arrow 56) until an end 58 of the base portion 44 of the shank 38 contacts the stop 54. The actuator 52 may also allow the shank 38 to pivot away from the predetermined tool position (e.g., to a shallower depth of penetration), such as in a second pivot direction (indicated by arrow 60) opposite the first pivot direction 56, when encountering rocks or other impediments in the field. Additionally, as will be described below, a controller may be configured to control the operation of the actuator 52 to actively adjust a penetration depth (indicated by arrow 62) of the shank 38 and/or the force applied to the shank 38.

It should be appreciated that the actuator 52 may be configured as any suitable type of actuator configured to bias the shank 38 relative to the frame 28 or otherwise apply a force to the shank 38. For example, in several embodiments, the actuator 52 may be configured as a suitable fluid-driven actuator, such as a suitable hydraulic or pneumatic cylinder. However, in alternative embodiments, the actuator 52 may be configured as any other suitable type of actuator, such as an electric linear actuator. Additionally, in a further embodiment, a spring (not shown) may be configured to bias the shank 38 relative to the frame 28 in lieu of the actuator 52.

It should be further appreciated that the configuration of the agricultural implement 10 and the work vehicle 12 described above and shown in FIGS. 1 and 2 is provided only to place the present subject matter in an exemplary field of use. Thus, it should be appreciated that the present subject matter may be readily adaptable to any manner of implement and/or vehicle configuration.

In accordance with aspects of the present subject matter, the agricultural implement 10 may include one or more imaging devices 104 coupled thereto and/or supported thereon for capturing images or other image data associated the flow of soil around one or more ground-engaging tools of the implement 10 as such tool(s) are pulled through the soil during the performance of an agricultural operation (e.g., a tillage operation) by the implement 10. Specifically, in several embodiments, the imaging device(s) 104 may be provided in operative association with the implement 10 such that one or more ground-engaging tools of the implement 10 are positioned within a field(s) of view or sensor detection range of the imaging device(s) 104. In this respect, the imaging device(s) 104 may be used to capture image data depicting or otherwise associated with the flow of soil around such ground-engaging tool(s) within the associated field(s) of view of during the performance of the agricultural operation. As will be described below, by analyzing the features of the flow(s) of soil around the ground-engaging tool(s) (e.g., the size, shape, velocity, and/or direction of travel of a plurality of soil units within the flow(s) of soil around the tool(s)), a controller 102 may then determine when such tool(s) of the implement 10 are plugged.

In general, the imaging device(s) 104 may correspond to any suitable sensing device(s) configured to detect or capture images or other image data indicative of the soil flow around the ground-engaging tool(s) of the implement 10. For instance, in several embodiments, the imaging device(s) 104 may correspond to a suitable camera(s) configured to capture three-dimensional images of the soil surface, thereby allowing the soil flow around the ground-engaging tools to be analyzed. For instance, in a particular embodiment, the imaging device(s) 104 may correspond to a stereographic camera(s) having two or more lenses with a separate image sensor for each lens to allow the camera(s) to capture stereographic or three-dimensional images. In further embodiments, the imaging device(s) 104 may correspond to any other suitable sensing device(s) configured to detect or capture images or image-like data associated with the soil flow around the ground-engaging tools, such as a monocular camera(s), a radio detection and ranging (RADAR) sensor(s), or a light detection and ranging (LIDAR) sensor(s).

It should be appreciated that the imaging device(s) 104 may be mounted on or otherwise installed on the implement 10 at any suitable location(s). For example, as shown in FIG. 2, in one embodiment, an imaging device 104 may be installed on the frame 28 of the implement 10 such that a shank 38 is positioned within a field of view (indicated by dashed lines 106) of the imaging device 104. In this respect, in such an embodiment, the field of view 106 of the imaging device 104 may be directed at a portion of the field where the shank 38 penetrates the field surface. As such, the imaging device 104 may be configured to capture data indicative of the soil flow around the shank 38 as the shank 38 is moved through the soil during as the implement 10 performs the agricultural operation. However, in other embodiments, the imaging device 104 may be installed at any other suitable location on the implement 10 such that one or more ground-engaging tools (e.g., a disk blade(s) 36, a shank(s) 38, and/or a leveling blade(s) 40) is positioned within its field of view 106. Furthermore, in alternative embodiments, the imaging device 104 may be mounted on another piece of equipment. For example, in one such alternative embodiment, the imaging device 104 may be mounted on an unmanned aerial vehicle (UAV) tethered to the implement 10. Moreover, it should be appreciated that, although FIG. 2 illustrates one imaging device 104 installed on the implement 10, any other suitable number of imaging devices 104 may be installed the implement 10, such as two or more imaging devices 104.

Figure 3:
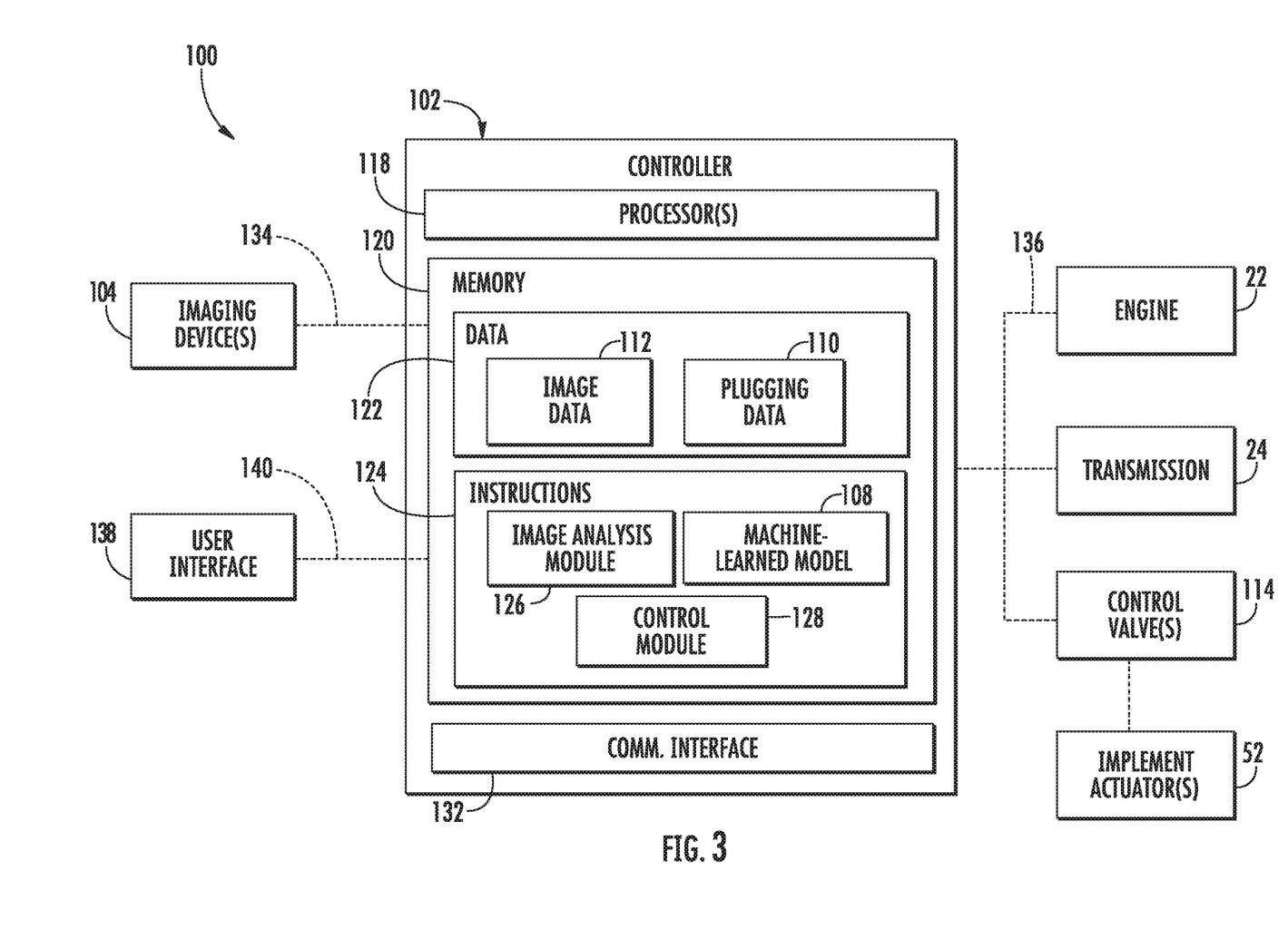
FIG. 3 illustrates a schematic view of one embodiment of a computing system in accordance with aspects of the present subject matter.
Figure 4:
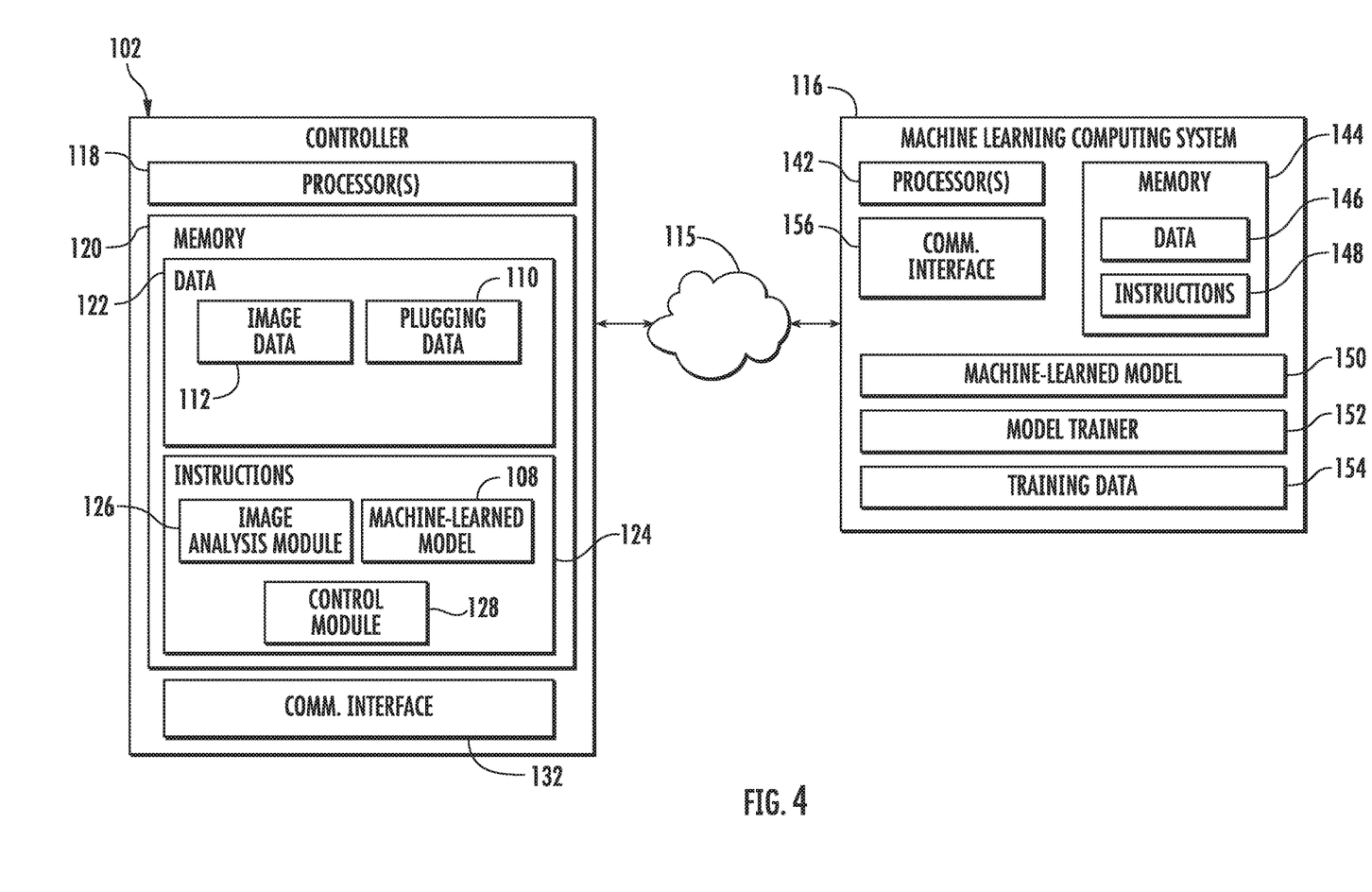
FIG. 4 illustrates a schematic view of one embodiment of a computing system in accordance with aspects of the present subject matter.

Referring now to FIGS. 3 and 4, schematic views of embodiments of a computing system 100 are illustrated in accordance with aspects of the present subject matter. In general, the system 100 will be described herein with reference to the agricultural implement 10 and the work vehicle 12 described above with reference to FIGS. 1 and 2. However, it should be appreciated that the disclosed system 100 may generally be utilized with agricultural implements having any other suitable implement configuration and/or work vehicles having any suitable other suitable vehicle configuration.

In several embodiments, the system 100 may include a controller 102 and various other components configured to be communicatively coupled to and/or controlled by the controller 102, such as one or more imaging devices 104 and/or various components of the agricultural implement 10 and/or the work vehicle 12. In some embodiments, the controller 102 is physically coupled to or otherwise installed on the implement 10 and/or the vehicle 12. In other embodiments, the controller 102 is not physically coupled to the implement 10 and/or the vehicle 12 (e.g., the controller 102 may be remotely located from the implement 10 and/or the vehicle 12) and instead may communicate with the implement 10 and/or the vehicle 12 over a wireless network.

As will be described below, the controller 102 may be configured to leverage a machine-learned classification model 108 to determine when one or more ground-engaging tools of the implement 10 are plugged based at least in part on imagery of the flow of soil such tools that is captured by one or more imaging devices 104. In particular, FIG. 3 illustrates a computing environment in which the controller 102 can operate to determine plugging data 110 for one or more of the ground-engaging tools of the implement 10 based on image data 112 newly received from the one or more imaging devices 104 and, further, to control one or more components of an implement and/or an associated work vehicle (e.g., the engine 22, the transmission 24, a control valve(s) 114, etc.) based on the plugging data 110. That is, FIG. 3 illustrates a computing environment in which the controller 102 is actively used in conjunction with an agricultural implement and/or an associated work vehicle (e.g., during operation of the implement 10 and/or vehicle 12 within a field). As will be discussed below, FIG. 4 depicts a computing environment in which the controller 102 can communicate over a network 115 with a machine learning computing system 116 to train and/or receive a machine-learned classification model 108. Thus, FIG. 4 illustrates operation of the controller 102 to train a machine-learned classification model 108 and/or to receive a trained machine-learned classification model 108 from a machine learning computing system 116 (e.g., FIG. 4 shows the "training stage"), while FIG. 3 illustrates operation of the controller 102 to use the machine-learned classification model 108 to determine when one or more ground-engaging tools of the implement 10 are plugged based on obtained imagery of the soil flow around such tool(s) (e.g., FIG. 3 shows the "inference stage").

Referring first to FIG. 3, in general, the controller 102 may correspond to any suitable processor-based device(s), such as a computing device or any combination of computing devices. Thus, as shown in FIG. 3, the controller 102 may generally include one or more processor(s) 118 and associated memory devices 120 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 120 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 120 may generally be configured to store information accessible to the processor(s) 118, including data 122 that can be retrieved, manipulated, created and/or stored by the processor(s) 118 and instructions 124 that can be executed by the processor(s) 118.

In several embodiments, the data 122 may be stored in one or more databases. For example, the memory 120 may include an image database 112 for storing image data received from the imaging device(s) 104. As described above, the imaging device(s) 104 may be configured to continuously or periodically capture images of portion(s) of the soil flow around one or more ground-engaging tool(s) (e.g., a shank(s) 38) of the implement 10 as an agricultural operation (e.g., a tillage operation) is being performed within the field. In this regard, the images transmitted to the controller 102 from the imaging device(s) 104 may be stored within the image database 112 for subsequent processing and/or analysis. It should be appreciated that, as used herein, the term image data may include any suitable type of data received from the imaging device(s) 104 that allows for the flow of soil around the ground-engaging tools of the implement 10 to be analyzed, including photographs and other image-related data (e.g., point cloud data and/or the like).

Additionally, as shown in FIG. 3, the memory 120 may include a plugging database 110 for storing information related to whether one or more ground-engaging tools of the implement 10 performing an agricultural operation on the field are plugged. For example, as indicated above, based on the image data received from the imaging device(s) 104, the controller 102 may be configured to determine when one or more of the ground-engaging tools of the implement 10 are plugged based on one or more features associated with the soil flow around such tool(s) (e.g., the size, shape, velocity, and/or direction of travel of a plurality of soil units within the flow(s) of soil around the tool(s)) as depicted the image data 112. The plugging determinations (e.g., plugged or not plugged) for one or more ground-engaging tools of the implement 10 made by the controller 102 may then be stored within the plugging database 110 for subsequent processing and/or analysis.

Referring still to FIG. 3, in several embodiments, the instructions 124 stored within the memory 120 of the controller 102 may be executed by the processor(s) 118 to implement an image analysis module 126. In general, the image analysis module 126 may be configured to analyze the image data 112 to determine the plugging data 110. Specifically, as will be discussed further below, the image analysis module 126 can cooperatively operate with or otherwise leverage a machine-learned classification model 108 to analyze the image data 110 to determine the plugging data 110. For example, the image analysis module 126 can perform some or all of method 200 illustrated in FIG. 5 and/or method 300 illustrated in FIG. 6. It should be appreciated that the controller 102 (e.g., the image analysis module 126) may be configured to perform the above-referenced analysis for multiple imaged sections of the field. In such instances, each section can be analyzed individually or multiple sections can be analyzed in a batch (e.g., by concatenating imagery depicting such multiple sections).

Moreover, as shown in FIG. 3, the instructions 124 stored within the memory 120 of the controller 102 may also be executed by the processor(s) 118 to implement a machine-learned classification model 108. Specifically, in one embodiment, the machine-learned classification model 108 may be a machine-learned neural network classification model, such as a convolutional neural network (CNN) classification model. However, the machine-learned classification model 108 may be any suitable statistical classification method, including regression models, support-vector machines (SVM), decision trees (e.g. random forests), kernel estimators (e.g. k-Nearest Neighbor), Bayes classifiers, texton-classifiers, and/or the like. The machine-learned classification model 108 may be configured to receive one or more sets of features extracted from imagery associated with the soil flow(s) around the ground-engaging tool(s) of the implement 10. Moreover, the machine-learned classification model 108 may be configured to process the received set(s) of features to compute or output one or more soil flow classifications of the imagery based on the received set(s) of features. For example, features used to classify the imagery may include the size, shape, velocity, and/or direction of travel of a plurality of soil particles or units within the flow of soil around the tool(s).

Referring still to FIG. 3, the instructions 124 stored within the memory 120 of the controller 102 may also be executed by the processor(s) 118 to implement a control module 128. In general, the control module 128 may be configured to adjust the operation of the implement 10 and/or the vehicle 12 by controlling one or more components of the implement 10 and/or the vehicle 12. Specifically, when it is determined by the image analysis module 126 that one or more ground-engaging tools of the implement 10 are plugged, the control module 128 may be configured to adjust the operation of the implement 10 and/or the vehicle 12 in a manner designed to perform one or more control actions associated with de-plugging such ground-engaging tools.

In several embodiments, when it is determined that one or more ground-engaging tools of the implement 10 are plugged, the control module 128 may be configured to adjust the operational or ground speed of the implement 10 in a manner that de-plugs such tool(s) and/or prevents/minimizes plugging of the non-plugged tool(s). In such embodiments, as shown in FIG. 3, the controller 102 may be communicatively coupled to the engine 22 and/or the transmission 24 of the vehicle 12. In this regard, the controller 102 may be configured to adjust the operation of the engine 22 and/or the transmission 24 in a manner that increases or decreases the ground speed of the work vehicle 12 and, thus, the ground speed of the implement 10, such as by transmitting suitable control signals for controlling an engine or speed governor (not shown) associated with the engine 22 and/or transmitting suitable control signals for controlling the engagement/disengagement of one or more clutches (not shown) provided in operative association with the transmission 24. In one embodiment, the implement 10 may communicate with the vehicle 12 to request or command a particular ground speed and/or particular increase or decrease in ground speed from the vehicle 12. For example, the implement 10 may include or otherwise leverage an ISOBUS Class 3 system to control the speed of the vehicle 12.

In addition to the adjusting the ground speed of the implement/vehicle 10/12 (or as an alternative thereto), the control module 128 may also be configured to adjust one or more operating parameters associated with the ground-engaging tools of the implement 10. For instance, as shown in FIG. 3, the controller 102 may be communicatively coupled to one or more control valves 114 configured to regulate the supply of fluid (e.g., hydraulic fluid or air) to one or more corresponding actuators 52 (e.g., fluid-driven cylinder(s)) of the implement 10. In such an embodiment, by regulating the supply of fluid to the actuator(s) 52, the controller 102 may automatically adjust the penetration depth of and/or the force applied to the ground-engaging tools (e.g., the disk blade(s) 36, the shank(s) 38, and/or the leveling blade(s) 40) of the implement 10.

Moreover, as shown in FIG. 3, the controller 102 may also include a communications interface 132 to provide a means for the controller 102 to communicate with any of the various other system components described herein. For instance, one or more communicative links or interfaces 134 (e.g., one or more data buses) may be provided between the communications interface 132 and the imaging device(s) 104 to allow image data transmitted from the imaging device(s) 104 to be received by the controller 102. Similarly, one or more communicative links or interfaces 136 (e.g., one or more data buses) may be provided between the communications interface 132 and the engine 22, the transmission 24, the control valves 114, and/or the like to allow the controller 102 to control the operation of such system components.

Furthermore, in one embodiment, the computing system 100 may also include a user interface 138. More specifically, the user interface 138 may be configured to provide feedback (e.g., feedback associated with plugging of the ground-engaging tools of the implement 10) to the operator of the implement/vehicle 10/12. As such, the user interface 138 may include one or more feedback devices (not shown), such as display screens, speakers, warning lights, and/or the like, which are configured to provide feedback from the controller 102 to the operator. In addition, the user interface 138 may be configured to receive inputs (e.g., inputs associated with the correct classification of the image data 112) from the operator. In this regard, the user interface 138 may include one or more input devices (not shown), such as touchscreens, keypads, touchpads, knobs, buttons, sliders, switches, mice, microphones, and/or the like, which are configured to receive inputs from the operator. Furthermore, one or more communicative links or interfaces 140 (e.g., one or more data buses) may be provided between the communications interface 132 of the controller 102 and the user interface 138 to allow feedback to be transmitted from the controller 102 to the user interface 138 and/or the inputs to be transmitted from the user interface 138 to the controller 102. In one embodiment, the user interface 138 may be mounted or otherwise positioned within the cab 22 of the vehicle 12. However, in alternative embodiments, the user interface 138 may mounted at any other suitable location.

Referring now to FIG. 4, according to an aspect of the present disclosure, the controller 102 can store or include one or more machine-learned classification models 108. Specifically, in several embodiments, the machine-learned classification model 108 may be configured to receive input data (e.g., features extracted from imagery captured by the imaging device(s) 104) and to process the input data to output one or more soil flow classifications for the soil flow(s) depicted in the imagery.

In some embodiments, the machine-learned classification model 108 may be a machine-learned convolutional neural network including a plurality of layers. The plurality of layers may include one or more convolutional layers, activation functions, pooling layers, and/or fully-connected layers. In one embodiment, the convolutional neural network may include a final layer. The final layer may be a fully-connected layer. Furthermore, the final layer may indicate the output of the network that assigns to the set(s) of features one of a plugged soil flow or a non-plugged soil flow. In some embodiments, a SoftMax function applied by and to the final layer may provide the output.

As an alternative to the convolutional neural network, other forms of neural networks may be used. Example neural networks include feed-forward neural networks, recurrent neural networks (e.g., long short-term memory recurrent neural networks), or other forms of neural networks. Neural networks may include multiple connected layers of neurons, and networks with one or more hidden layers may be referred to as "deep" neural networks. Typically, at least some of the neurons in a neural network may include non-linear activation functions.

As further examples, the machine-learned classification model 108 may include a regression model (e.g., logistic regression classifier), a support vector machine, one or more decision-tree based models (e.g., random forest models), a Bayes classifier, a K-nearest neighbor classifier, a texton-based classifier, and/or other types of models including both linear models and non-linear models. For example, texton-based classifiers can provide classifications based on an analysis of texture content included in the image data. As such, a texton-classifier can match the texture of an image to a closest match within a dictionary of textures (e.g., similar to a nearest neighbor algorithm).

In some embodiments, the machine-learned classification model 108 may be a binary classifier configured to output, for each set of features extracted from the captured image data, a binary soil flow classification that classifies such set of extracted features as being associated with a plugged soil flow or a non-plugged soil flow. In other embodiments, the machine-learned classification model 108 may be a multi-class classifier configured to output, for each set of extracted features, a multi-class soil flow classification that classifies such set of extracted features as being associated with various levels of plugging (e.g., a non-plugged soil flow, a moderately plugged soil flow, a severely plugged soil flow, etc.). Other classification/labeling schemes may be used in addition or alternatively to these example schemes.

In one embodiment, the machine-learned classification model 108 may be configured to output a plurality of classifications for the sets of features extracted from the image data 112, with each classification being attached to the set of features extracted from a particular image frame. In certain instances, one or more ground-engaging tools of the implement 10 may be plugged, while one or more other ground-engaging tools may not be plugged. In such instances, the soil flow around the plugged ground-engaging tool(s) may differ from the soil flow around the non-plugged ground-engaging tool(s). In such instances, the machine-learned classification model 108 may be configured to output a plugged soil flow classification for each set of features extracted from an image frame depicting a plugged ground-engaging tool. Conversely, the machine-learned classification model 108 may be configured to output a non-plugged soil classification for each set of features extracted from an image frame depicting a non-plugged ground-engaging tool.

In some embodiments, the machine-learned classification model 108 may further provide, for each of one or more classes, a numerical value descriptive of a degree to which it is believed that the input data should be classified into the corresponding class. In some instances, the numerical values provided by the machine-learned classification model may be referred to as "confidence scores" that are indicative of a respective confidence associated with classification of the input into the respective class. In some embodiments, the confidence scores may be compared to one or more thresholds to render a discrete categorical classification. In some embodiments, only a certain number of classes (e.g., one) with the relatively largest confidence scores may be selected to render a discrete categorical prediction.

In some embodiments, the controller 102 may receive the one or more machine-learned classification models 108 from the machine learning computing system 116 over network 115 and may store the one or more machine-learned classification models 108 in the memory 120. The controller 102 may then use or otherwise run the one or more machine-learned classification models 108 (e.g., via the processor(s) 118).

The machine learning computing system 116 may include one or more processors 142 and a memory 144. The one or more processors 142 may be any suitable processing device such as those described with reference to the processor(s) 118. The memory 144 may include any suitable storage device(s) such as those described with reference to memory 120.

The memory 144 may store information that can be accessed by the one or more processors 142. For instance, the memory 144 (e.g., one or more non-transitory computer-readable storage mediums, memory devices) may store data 146 that can be obtained, received, accessed, written, manipulated, created, and/or stored. In some embodiments, the machine learning computing system 116 may obtain data from one or more memory device(s) that are remote from the system 116. Furthermore, the memory 144 may also store computer-readable instructions 148 that can be executed by the processor(s) 142. The instructions 148 may, in turn, be software written in any suitable programming language or may be implemented in hardware. Additionally, or alternatively, the instructions 148 can be executed in logically and/or virtually separate threads on processor(s) 142. For example, the memory 144 may store instructions 148 that when executed by the processor(s) 142 cause the processor(s) 142 to perform any of the operations and/or functions described herein.

In some embodiments, the machine learning computing system 116 may include one or more server computing devices. When the machine learning computing system 116 includes multiple server computing devices, such server computing device(s) may operate according to various computing architectures, including, for example, sequential computing architectures, parallel computing architectures, or some combination thereof.

In addition to or as an alternative to the model(s) 108 at the controller 102, the machine learning computing system 116 can include one or more machine-learned classification models 150. For example, the model(s) 150 may be the same as described above with reference to the model(s) 108.

In some embodiments, the machine learning computing system 116 may communicate with the controller 102 according to a client-server relationship. For example, the machine learning computing system 116 may implement the machine-learned classification models 150 to provide a web service to the controller 102. For example, the web service can provide image analysis for plugging detection as a service. Thus, machine-learned classification models 108 can be located and used at the controller 102 and/or machine-learned classification models 150 can be located and used at the machine learning computing system 116.

In some embodiments, the machine learning computing system 116 and/or the controller 102 may train the machine-learned classification models 108 and/or 150 through use of a model trainer 152. The model trainer 152 may train the machine-learned classification models 108 and/or 150 using one or more training or learning algorithms. One example training technique is backwards propagation of errors ("backpropagation"). Gradient-based or other training techniques may be used.

In some embodiments, the model trainer 152 may perform supervised training techniques using a set of labeled training data 154. For example, the labeled training data 154 may include sets of features, with each set of features being labeled (e.g., manually by an expert and/or manually by a user of the models) with a "correct" or ground-truth label. Thus, each training example may include a set of features and a corresponding ground-truth classification for the set of features. The labels used for the training data 154 may match any of the example labelling schemes described herein, including binary labels (e.g., plugged soil flow or non-plugged soil), multi-label labels (e.g., non-plugged soil flow, moderately plugged soil flow, severely plugged soil flow, etc.), or other labelling schemes.

In other embodiments, the model trainer 152 may perform unsupervised training techniques using a set of unlabeled training data 154. The model trainer 152 may perform a number of generalization techniques to improve the generalization capability of the models being trained. Generalization techniques include weight decays, dropouts, or other techniques. The model trainer 152 may be implemented in hardware, software, firmware, or combinations thereof.

Thus, in some embodiments, the model(s) may be trained at a centralized computing system (e.g., at "the factory") and then distributed to (e.g., transferred to for storage by) specific controllers. Additionally, or alternatively, the models can be trained (or re-trained) based on additional training data generated by the user. For example, as will be described below, the image frame associated with each set of extracted features may be displayed to the operator of the implement/vehicle 10/12 (e.g., via the user interface 138) as the implement/vehicle 10/12 travels across the field. Thereafter, the operator may input (e.g., via the user interface 138) the correct or ground-truth classification to the computing system 100 for each displayed image frame, which may then be used to train the model(s) This process may be referred to as "personalization" of the model(s) and may allow the operator to further train the models to provide improved (e.g., more accurate) predictions for unique field conditions experienced by the operator.

The network(s) 115 may be any type of network or combination of networks that allows for communication between devices. In some embodiments, the network(s) 115 may include one or more of a local area network, wide area network, the Internet, secure network, cellular network, mesh network, peer-to-peer communication link and/or some combination thereof and can include any number of wired or wireless links. Communication over the network(s) 115 may be accomplished, for instance, via a communications interface using any type of protocol, protection scheme, encoding, format, packaging, etc. Additionally, the machine learning computing system 116 may also include a communications interface to communicate with any of the various other system components described herein.

FIGS. 3 and 4 illustrate example computing systems that may be used to implement the present disclosure. Other computing systems may be used as well. For example, in some embodiments, the controller 102 may include the model trainer 152 and the training dataset 154. In such embodiments, the machine-learned classification model(s) 108 may be both trained and used locally at the controller 102. As another example, in some embodiments, the controller 102 may not connected to other computing systems.

Figure 5:
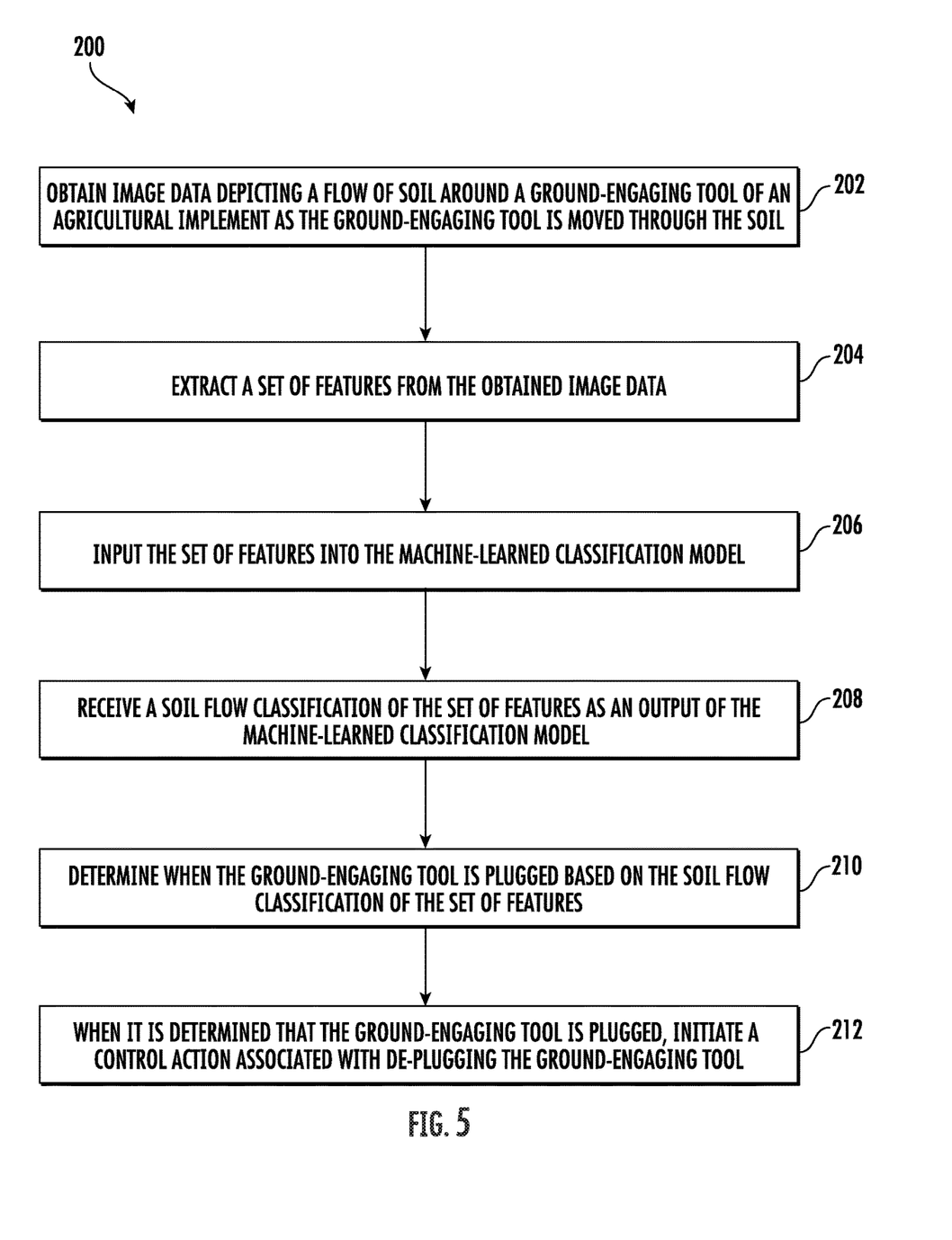
FIG. 5 illustrates a flow diagram of one embodiment of a method for detecting plugging of a ground-engaging tool of an agricultural implement in accordance with aspects of the present subject matter.

Referring now to FIG. 5, a flow diagram of one embodiment of a method 200 for detecting plugging of a ground-engaging tool of an agricultural implement based on image data of a field is illustrated in accordance with aspects of the present subject matter. In general, the method 200 will be described herein with reference to the agricultural implement 10 and the work vehicle 12 shown in FIGS. 1 and 2, as well as the various system components shown in FIGS. 3 and/or 4. However, it should be appreciated that the disclosed method 200 may be implemented with agricultural implements having any other suitable implement configuration, work vehicles having any other suitable vehicle configuration, and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include obtaining image data depicting a flow of soil around a ground-engaging tool of an agricultural implement as the ground-engaging tool is moved through the soil. As described above, the implement 10 may include one or more ground-engaging tools (e.g., the disk blade(s) 36, the shank(s) 38, and/or the leveling blade(s) 40) that are moved through the soil in the field such that the soil flows around the tool(s) during the performance of an agricultural operation (e.g., a tillage operation). In this respect, the characteristics of the soil flow around the ground-engaging tool(s) (e.g., the size, shape, velocity, and/or direction of travel of a plurality of soil units within the flow(s) of soil around the tool(s)) may generally be indicative of the performance of the ground-engaging tool(s). For example, characteristics of the soil flow around a plugged tool may differ from the characteristics of the soil flow around a non-plugged tool. As such, the controller 102 may be communicatively coupled to one or more imaging devices 104, with each imaging device 104 configured to capture image data associated with the soil flow around one or more ground-engaging tools of the implement 10.

In some embodiments, the image data obtained at (202) may include a single image frame. Thus, in some embodiments, the method 200 may be performed iteratively for each new image frame as such image frame is received. For example, method 200 may be performed iteratively in real-time as new images are received from the imaging device(s) 104, while the imaging device(s) 104 are moved throughout the field (e.g., as a result of being installed on the implement 10 or a UAV tethered to the implement 10).

In other embodiments, the image data obtained at (202) may include a plurality of image frames. In such embodiments, the plurality of image frames may be concatenated or otherwise combined and processed as a single batch (e.g., by way of a single performance of method 200 over the batch). For example, in one embodiment, image frames from several image capture devices 104 may be concatenated to form a single image frame depicting the soil flow around several ground-engaging tools (e.g., a rank or row of shanks 38) of the implement 10.

Furthermore, at (204), the method 200 may include extracting a set of features from the obtained image data. In general, each set of features extracted from the image data may correspond to one or more characteristics of the soil flow around the ground-engaging tool(s) depicted in the obtained image data. For example, as will be described below, in several embodiments, the extracted features may include the sizes, shapes, speeds, and/or directions of travel of the soil units present within the depicted soil flow(s). In one embodiment, the extracted features may include one or more parameters (e.g., roughness, waviness, spacing, etc.) associated with the texture of the depicted soil flow. However, it should be appreciated that any other suitable features or parameter may be extracted from the image data received at (202), such as pixel color. Additionally, each set of features may correspond to one or more features or characteristics extracted from a single image frame. Thus, when a plurality of image frames is obtained at (202), a set of features may be extracted from each obtained image frame.

At (204), in several embodiments, the method 200 may include extracting the set(s) of features from the obtained image data based on soil units identified within the obtained image data. Specifically, in such embodiments, the image analysis module 126 of the controller 102 may be configured to identify a plurality of soil units within each image frame of the obtained image data. For example, in one embodiment, the image analysis module 126 may use a suitable algorithm(s) (e.g., an edge-detection algorithm, such as a Canny edge detector) to identify a plurality of soil units within a plurality of sequential image frames. The image analysis module 126 may then be configured to determine the sizes and/or shapes of the identified soil units and/or track or monitor the positions of each identified soil unit relative to the corresponding ground-engaging tool as the soil units move across the image frames. Thereafter, the image analysis module 126 may be configured to determine the speeds and/or the directions of travel of the identified soil units within the image frames. Furthermore, in one embodiment, the image analysis module 126 may be configured to extract one or more parameters (e.g., roughness, waviness, spacing, etc.) associated with the texture of the depicted soil flow. However, in alternative embodiments, the controller 108 may be configured to extract features associated with the flow of soil around the ground-engaging tool(s) in any other suitable manner. For example, in one embodiment, at (204), an embedding or feature map may be generated.

It should be appreciated that, as used herein, "soil units" may refer to any unit soil that may flow around the ground-engaging tool(s) of the implement 10. As such, each soil unit may be an individual soil particle or a combination/aggregation of soil particles (e.g., a soil clod).

As shown in FIG. 5, at (206), the method 200 may include inputting the set of features into a machine-learned classification model. As described above, the machine-learned classification model may be configured to receive input data and to process the input data to output one or more soil flow classifications for the input data. As such, the image analysis module 126 of the controller 102 may be configured to input the sets of extracted features into the machine-learned classification model 108. In some embodiments, the inputted sets of features may correspond to or otherwise have been extracted from an entirety of the image data, such that all of the image data is analyzed. In other embodiments, the inputted sets of features may correspond to or otherwise have been extracted only a portion or subset of the image data. Using only a subset of the image data may enable reductions in processing time and requirements.

Additionally, at (208), the method 200 may include receiving a soil flow classification of the image data as an output of the machine-learned classification model. For example, as indicated above, the image analysis module 126 of the controller 102 may be configured to receive a respective soil flow classification for the sets of extracted features as an output of the machine-learned classification model 108. As described above, in some embodiments, the classification received for the sets of extracted features at (208) can be a binary soil flow classification that classifies each set of extracted features (e.g., a set of features extracted from one of the image frames) as being associated with a plugged soil flow or a non-plugged soil flow. In other embodiments, the classification may be a multi-class visual soil flow that classifies the image data as being associated with a non-plugged soil flow, a moderately plugged soil flow, or a severely plugged soil flow. Other classification/labeling schemes can be used in addition or alternatively to these example schemes.

Moreover, at (208), the method 200 may include obtaining a respective confidence score associated with each soil flow classification. For example, the image analysis module 126 of the controller 102 may be configured to receive the confidence scores as a further output from the machine-learned classification model 108 respectively alongside the classifications output for the sets of extracted features. Specifically, in some embodiments, the machine-learned classification model can output a confidence scores for each set of features extracted from the obtained image data. As example, the confidence values may either be a binary value (e.g., where 0 corresponds to complete confidence is a non-plugged soil flow and 1 corresponds to complete confidence in a plugged soil flow) or a range in between those values.

As shown in FIG. 5, at (210), the method 200 may include determining when the ground-engaging tool of the implement is plugged based on the soil flow classification of the sets of extract features. For example, the image analysis module 126 of the controller 102 may be configured to determine when one or more ground-engaging tools of the implement 10 are plugged based on the received soil flow classification(s) (e.g., plugged soil flow or non-plugged soil flow) of the sets of features extracted from the image data 112. For example, when the received soil classification for a set of features corresponding with the soil flow around a ground-engaging tool is associated with a plugged soil flow, the image analysis module 126 may determine that such tool is plugged.

Moreover, at (210), in several embodiments, the image analysis module 126 may be further configured to determine when the ground-engaging tool(s) are plugged based on the received classification(s) and the associated confidence scores. As described above, the machine-learned classification model 108 may also output confidence scores descriptive of the degree to which it is believed that the sets of features extracted from the image data should be classified into a corresponding soil flow class. For example, in such an embodiment, the image analysis module 126 may determine that the ground-engaging tool(s) are plugged when the received classification is associated with a plugged soil flow and the associated confidence score is over a threshold value (e.g., greater than eighty percent). Conversely, when the confidence score associated with a plugged soil flow for the sets of features falls below the threshold value, the image analysis module 126 may be configured to determine that the ground-engaging tools are not plugged.

In one embodiment, at (210), the image analysis module 126 may be configured to determine that one or more ground-engaging tools of the implement 10 are plugged after a threshold number of sets of features extracted from the image data 112 has been classified as being associated with a plugged soil. As described above, the image data 112 received by the controller 102 may include a plurality of image frames. In this regard, the output of the machine learned classification model 108 may be a soil flow classification for the set of features extracted from each image frame of the image data 112. As such, the image analysis module 126 may be configured to determine that one or more ground-engaging tools of the implement 10 are plugged after the sets of features extracted from a successive number of image frames (e.g., twenty image frames) or portions of image frames have been classified as being associated with a plugged soil flow.

In addition, after determining that one or more ground-engaging tools of the implement are plugged at (210), the method 200 may include, at (212), initiating a control action associated with de-plugging the tool(s). For example, as indicated above, the control module 128 of the controller 102 may be configured to control the operation of the implement 10 and/or the vehicle 12 to initiate one or more control actions associated with de-plugging the ground-engaging tool(s). For example, in one embodiment, the control module 128 may be configured to notify the operator of the implement/vehicle 10/12 that the one or more ground-engaging tools of the implement 10 are plugged (e.g., via the user interface 138). In one embodiment, the notification may include an indication (e.g., a corresponding color, such as green, yellow, and red) of the confidence score associated with the determination that the tool(s) is plugged. Additionally or alternatively, the control module 128 may be configured to adjust one or more operating parameters of the implement 10 and/or the vehicle 12, such as ground speed of the implement/vehicle 10/12, the penetration depth of the ground-engaging tool(s) of the implement 10, and/or the force applied to the tool(s), in a manner that de-plugs the tool(s).

Figure 6:
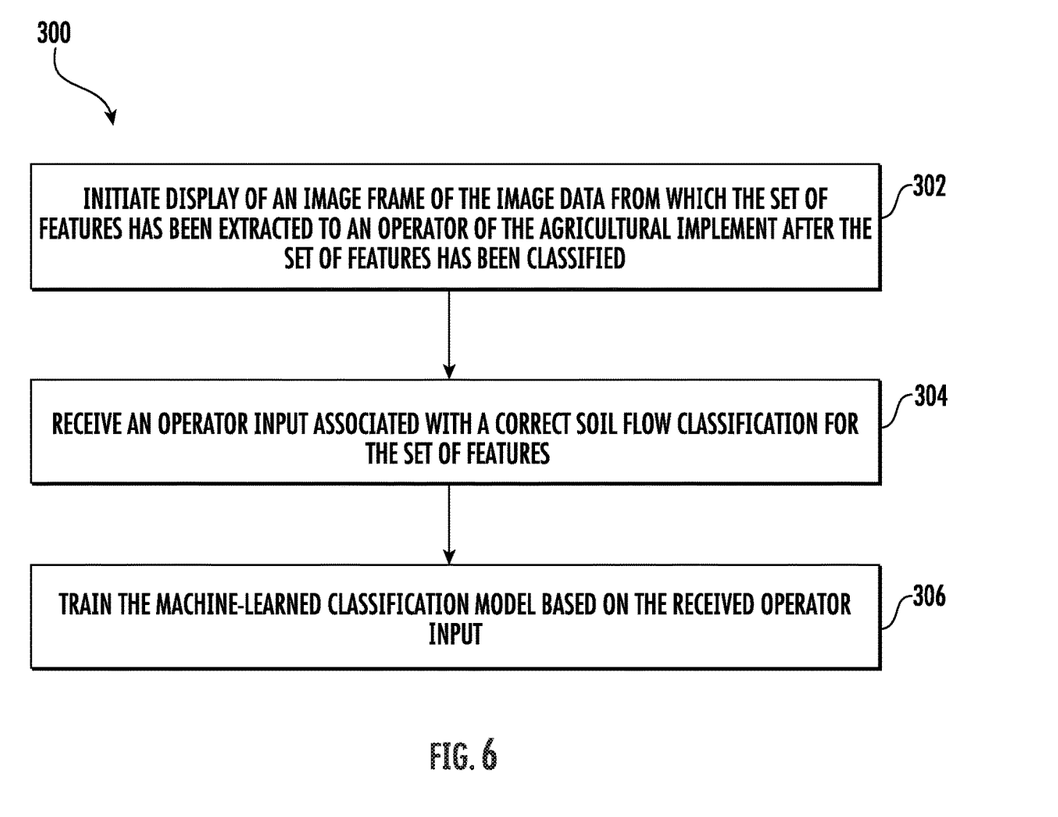
FIG. 6 illustrates a flow diagram of one embodiment of a method for training a machine-learned classification model for use in detecting plugging of a ground-engaging tool of an agricultural implement in accordance with aspects of the present subject matter.

Referring now to FIG. 6, a flow diagram of one embodiment of a method 300 for training a machine-learned classification model for use in detecting plugging of a ground-engaging tool of an agricultural implement is illustrated in accordance with aspects of the present subject matter. In general, the method 300 will be described herein with reference to the agricultural implement 10 and the work vehicle 12 shown in FIGS. 1 and 2, as well as the various system components shown in FIGS. 3 and/or 4. However, it should be appreciated that the disclosed method 300 may be implemented with agricultural implements having any other suitable implement configuration, work vehicles having any other vehicle suitable configuration, and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown, at (302), the method 300 may include initiating display of an image frame of the image data from which the set of features has been extracted to an operator of the agricultural implement after the set of features has been classified. As described above, the machine-learned classification model 108 may output one or more soil flow classifications for the set of features extracted from each image frame of the image data 112. For example, in one embodiment, the set of features extracted from each image frame may be classified as being associated with a plugged soil flow or a non-plugged soil flow. After such classification, the control module 128 may be configured to initiate display (e.g., via the user interface 138) of one or more of the image frames from which the classified sets of features were extracted to the operator of the implement/vehicle 10/12.

Additionally, at (304), the method 300 may include receiving an operator input associated with a correct soil flow classification for the image frame. For example, the operator of the implement 10/12 may view the displayed frame(s) and, for each image frame, provide (e.g., the user interface 138) the correct or ground-truth soil flow classification for such image frame.

Furthermore, as shown in FIG. 6, at (306), the method may include training the machine-learned classification model based on the received operator input. As described above, in certain embodiments, the controller 102 may include the model trainer 152. As such, in one embodiment, the model trainer 152 may be configured to train the machine-learned classification model 108 based on the received operator input(s) associated with the correct or ground-truth soil flow classification for the image frames of the image data 112 as provided by the operator. In such an embodiment, such "on-the-fly" training may allow the operator "personalize" the machine-learned classification model 108 to provide improved (e.g., more accurate) predictions for the unique field conditions experienced by the operator.

It is to be understood that the steps of the methods 200, 300 are performed by the controller 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 102 described herein, such as the methods 200, 300, is implemented in software code or instructions which are tangibly stored on a tangible computer readable medium. The controller 102 loads the software code or instructions via a direct interface with the computer readable medium or via a wired and/or wireless network. Upon loading and executing such software code or instructions by the controller 102, the controller 102 may perform any of the functionality of the controller 102 described herein, including any steps of the methods 200, 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A computing system, comprising:
   one or more processors; and
   one or more non-transitory computer-readable media that collectively store:
   a machine-learned classification model configured to receive input data and process the input data to output one or more soil flow classifications for the input data; and
   instructions that, when executed by the one or more processors, configure the computing system to perform operations, the operations comprising:
   obtaining image data depicting a flow of soil around a ground-engaging tool of an agricultural implement as the ground-engaging tool is moved through the soil;
   identifying a plurality of soil units within the flow of soil around the ground-engaging tool depicted in the image data;
   determining at least one of a size, a shape, a velocity, or a direction of travel of the plurality of soil units;
   inputting the at least one of the size, the shape, the velocity, or the direction of travel of the plurality of soil units into the machine-learned classification model;
   receiving a soil flow classification of the at least one of the size, the shape, the velocity, or the direction of travel of the plurality of soil units as an output of the machine-learned classification model; and
   determining when the ground-engaging tool is plugged based on the soil flow classification of the at least one of the size, the shape, the velocity, or the direction of travel of the plurality of soil units.

2. The computing system of claim 1, wherein:
   the machine-learned classification model is configured to output a confidence score for the soil flow classification of the at least one of the size, the shape, the velocity, or the direction of travel of the plurality of soil units; and
   determining when the ground-engaging tool is plugged comprises determining when the ground-engaging tool is plugged based on the confidence score and the soil flow classification of the at least one of the size, the shape, the velocity, or the direction of travel of the plurality of soil units.

3. The computing system of claim 1, wherein the machine-learned classification model comprises a binary classifier configured to output a binary soil flow classification that classifies the at least one of the size, the shape, the velocity, or the direction of travel of the plurality of soil units determined from the image data as being associated with a plugged soil flow or a non-plugged soil flow.

4. The computing system of claim 1, wherein the machine-learned classification model comprises a neural network.

5. The computing system of claim 1, wherein the image data comprises a plurality of image frames.

6. The computing system of claim 5, wherein determining the at least one of the size, the shape, the velocity, or the direction of travel of the plurality of soil units from the obtained image data comprises, for each image frame of the obtained image data, determining a corresponding at least one of the size, the shape, the velocity, or the direction of travel of the plurality of soil units.

7. The computing system of claim 1, wherein the operations further comprise:
   initiating display of an image frame of the image data from which the at least one of the size, the shape, the velocity, or the direction of travel of the plurality of soil units has been determined to an operator of the agricultural implement after the at least one of the size, the shape, the velocity, or the direction of travel of the plurality of soil units has been classified;
   receiving an operator input associated with a correct soil flow classification for the at least one of the size, the shape, the velocity, or the direction of travel of the plurality of soil units; and
   training the machine-learned classification model based on the received operator input.

8. The computing system of claim 1, wherein, when it is determined that the ground-engaging tool is plugged, the operations further comprise initiating a control action associated with de-plugging the ground-engaging tool.

9. The computing system of claim 8, wherein the control action comprises notifying an operator of the agricultural implement that the ground-engaging tool is plugged.

10. The computing system of claim 8, wherein the control action comprises adjusting an operating parameter of the agricultural implement.

11. The computing system of claim 1, wherein obtaining the image data comprises obtaining image data captured by an imaging device installed on the agricultural implement such that the ground-engaging tool is positioned within a field of view of the imaging device.

12. The computing system of claim 1, wherein determining the at least one of the size, the shape, the velocity, or the direction of travel of the plurality of soil units comprises determining the size of the plurality of soil units.

13. The computing system of claim 1, wherein determining the at least one of the size, the shape, the velocity, or the direction of travel of the plurality of soil units comprises determining the shape of the plurality of soil units.

14. The computing system of claim 1, wherein determining the at least one of the size, the shape, the velocity, or the direction of travel of the plurality of soil units comprises determining the velocity of the plurality of soil units.

15. The computing system of claim 1, wherein determining the at least one of the size, the shape, the velocity, or the direction of travel of the plurality of soil units comprises determining the direction of travel of the plurality of soil units.

16. A computer-implemented method, comprising:
   obtaining, with a computing system comprising one or more computing devices, image data depicting a flow of soil around a ground-engaging tool of an agricultural implement as the ground-engaging tool is moved through the soil;
   identifying, with the computing system, a plurality of soil units within the flow of soil around the ground-engaging tool depicted in the image data;
   determining, with the computing system, at least one of a size, a shape, a velocity, or a direction of travel of the plurality of soil units;
   inputting, with the computing system, the at least one of the size, the shape, the velocity, or the direction of travel of the plurality of soil units into a machine-learned classification model configured to configured to receive input data and process the input data to output one or more soil flow classifications for the at least one of the size, the shape, the velocity, or the direction of travel of the plurality of soil units;

receiving, with the computing system, a soil flow classification of the at least one of the size, the shape, the velocity, or the direction of travel of the plurality of soil units as an output of the machine-learned classification model; and determining, with the computing system, when the ground-engaging tool is plugged based on the soil flow classification of the at least one of the size, the shape, the velocity, or the direction of travel of the plurality of soil units.

17. The computer-implemented method of claim 16, wherein:

the machine-learned classification model is configured to output a confidence score for the soil flow classification of the at least one of the size, the shape, the velocity, or the direction of travel of the plurality of soil units; and determining when the ground-engaging tool is plugged comprises determining, with the computing system, when the ground-engaging tool is plugged based on the confidence score and the soil flow classification of the at least one of the size, the shape, the velocity, or the direction of travel of the plurality of soil units.

18. The computer-implemented method of claim 16, further comprising:

initiating, with the computing system, display of an image frame of the image data from which the at least one of the size, the shape, the velocity, or the direction of travel of the plurality of soil units has been determined to an operator of the agricultural implement after the set of features has been classified;

receiving, with the computing system, an operator input associated with a correct soil flow classification for the at least one of the size, the shape, the velocity, or the direction of travel of the plurality of soil units; and training, with the computing system, the machine-learned classification model based on the received operator input.

19. The computer-implemented method of claim 16, wherein, when it is determined that the ground-engaging tool is plugged, the computer-implemented method further comprises initiating, with the computing system, a control action associated with de-plugging the ground-engaging tool.

20. The computer-implemented method of claim 16, wherein determining the at least one of the size, the shape, the velocity, or the direction of travel of the plurality of soil units comprises determining, with the computing system, the size, the shape, or the direction of travel of the plurality of soil units.

* * * * *